(12) United States Patent
Haruyama

(10) Patent No.: US 10,942,388 B1
(45) Date of Patent: Mar. 9, 2021

(54) LIQUID CRYSTAL DEVICE AND ELECTRONIC APPARATUS

(71) Applicant: SEIKO EPSON CORPORATION, Tokyo (JP)

(72) Inventor: Akihide Haruyama, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/090,868

(22) Filed: Nov. 5, 2020

(30) Foreign Application Priority Data

Nov. 11, 2019 (JP) .............................. JP2019-203775

(51) Int. Cl.
*G02F 1/1335* (2006.01)
*G02F 1/13363* (2006.01)

(52) U.S. Cl.
CPC .... *G02F 1/133512* (2013.01); *G02F 1/13363* (2013.01); *G02F 1/133526* (2013.01)

(58) Field of Classification Search
CPC ........... G02F 1/133526; G02F 1/13363; G02F 1/133512; G02B 27/0955; H01L 51/5275
See application file for complete search history.

(56) References Cited

U.S. PATENT DOCUMENTS

2015/0041833 A1    2/2015 Nimura
2016/0245961 A1*   8/2016 Akasaka ........... G02F 1/133526
2018/0173048 A1*   6/2018 Ito ..................... G02F 1/13306
2019/0033642 A1    1/2019 Haruyama
2019/0049783 A1*   2/2019 Liao ..................... G02B 30/27
2019/0064584 A1    2/2019 Ito

FOREIGN PATENT DOCUMENTS

JP    2015034860    2/2015
JP    2015228040    12/2015
JP    2019028149    2/2019
JP    2019040153    3/2019

* cited by examiner

*Primary Examiner* — Michael H Caley
*Assistant Examiner* — Mariam Qureshi
(74) *Attorney, Agent, or Firm* — JCIPRNET

(57) ABSTRACT

A liquid crystal device includes a first substrate arranged on a light incident side and a second substrate that faces the first substrate through intermediation of a liquid crystal layer. A light shielding member is not provided in a display region of the first substrate. In a display region of the second substrate, a light shielding member in a lattice shape is provided between a substrate body and a pixel electrode. The second substrate includes a first lens member provided between the substrate body and the light shielding member, a second lens member provided between the light shielding member and the pixel electrode, and a third lens member provided between the second lens member and the pixel electrode. The liquid crystal device includes an optical compensation member on a light incident side of the third lens member.

9 Claims, 12 Drawing Sheets

LIQUID CRYSTAL DEVICE AND ELECTRONIC APPARATUS

The present application is based on, and claims priority from JP Application Serial Number 2019-203775, filed Nov. 11, 2019, the disclosure of which is hereby incorporated by reference herein in its entirety.

BACKGROUND

1. Technical Field

The present disclosure relates to a liquid crystal device and an electronic apparatus.

2. Related Art

In a transmissive liquid crystal device to be used as, for example, a light valve of a projection-type display apparatus, a liquid crystal layer is arranged between an element substrate and a counter substrate. On the element substrate, pixel electrodes and switching elements are formed. On the counter substrate, counter electrodes are formed. In the liquid crystal device, incident light from one of the element substrate and the counter substrate is modulated by an electro-optical layer, and an image is displayed (see JP-A-2015-34860 and JP-A-2019-40153). In the liquid crystal device described in JP-A-2015-34860 and JP-A-2019-40153, the element substrate is provided with a light shielding member in a lattice shape, which includes wiring lines and the like, between a substrate body and the pixel electrodes, and only light that reaches a light transmission area (pixel opening area) surrounded by the light shielding member contributes to the display. In view of this, for the element substrate, a first lens is provided between the substrate body of the element substrate and the light shielding member, and a second lens is provided between the pixel electrodes and the light shielding member.

Therefore, in the liquid crystal device described in JP-A-2015-34860, light that is to advance toward the light shielding member can be guided to the light transmission area by the second lens when the light is incident from a side of the counter substrate, and a tilt of a light beam emitted from the element substrate can be optimized by the first lens. However, when pixels are miniaturized, there is a problem in that light that is to advance toward the light shielding member cannot be guided efficiently to the light transmission area only by the second lens.

SUMMARY

In order to solve the above-mentioned problem, a liquid crystal device according to an aspect of the present disclosure includes a first substrate being arranged on a light incident side, the first substrate having no light shielding member provided in a display region, a liquid crystal layer, and a second substrate that is on a light emission side of the first substrate and includes a substrate body, a pixel electrode provided at a layer between the substrate body and the liquid crystal layer, a light shielding member in a lattice shape, the light shielding member provided at a layer between the substrate body and the pixel electrode, a first lens member provided at a layer between the substrate body and the light shielding member, a second lens member provided at a layer between the light shielding member and the pixel electrode, and a third lens member provided at a layer between the second lens member and the pixel electrode.

The liquid crystal device according to the present disclosure can be used for various electronic apparatuses. When an electronic apparatus is applied as a projection-type display apparatus, the electronic apparatus includes a light-source unit configured to emit illumination light that enters the liquid crystal device, and a projection optical system configured to project modulated light emitted from the liquid crystal device.

DESCRIPTION OF EXEMPLARY EMBODIMENTS

Figure 1:
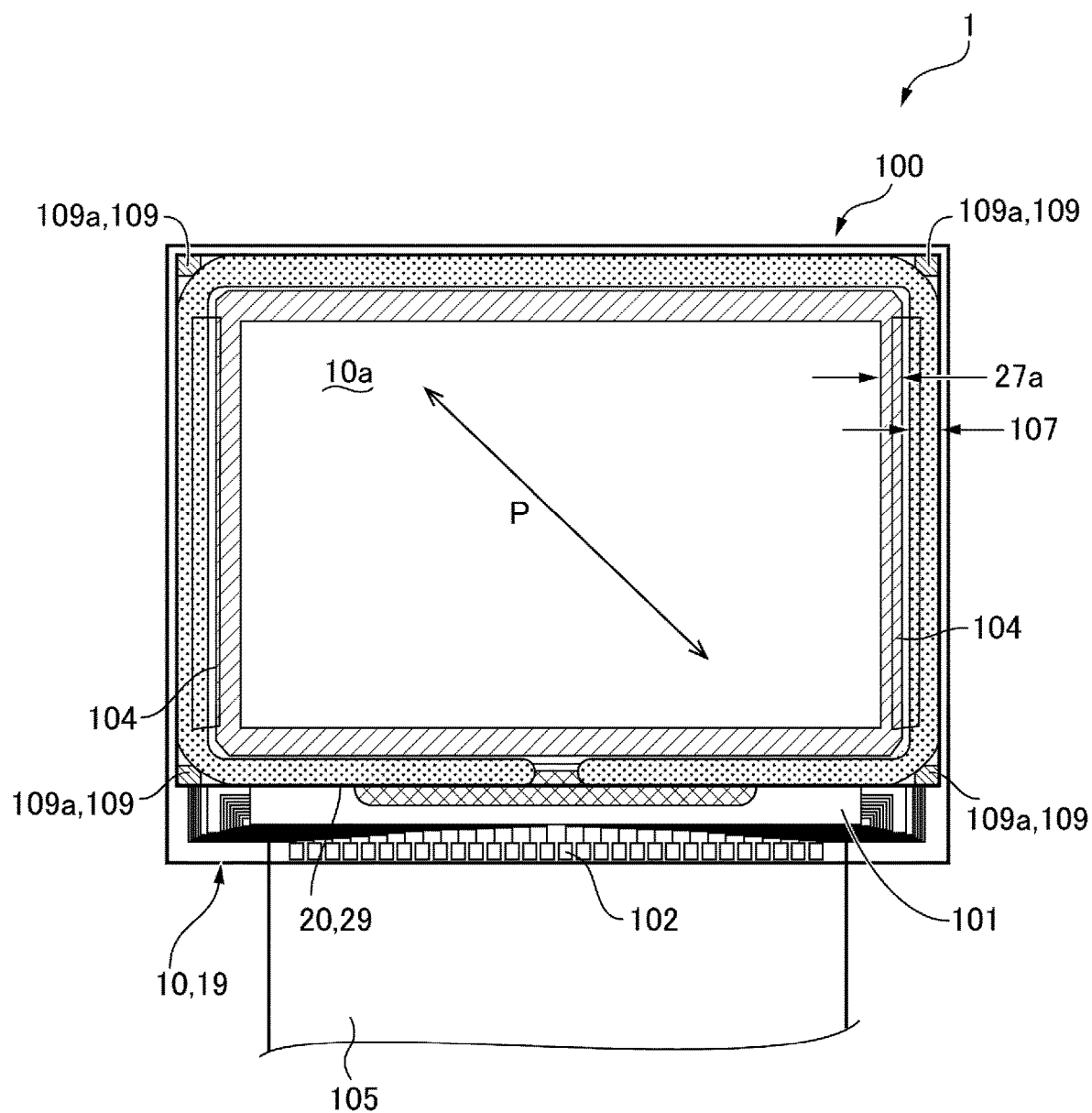
FIG. 1 is a plan view illustrating an aspect of a liquid crystal panel used in a liquid crystal device to which the present disclosure is applied.

Exemplary embodiments of the disclosure will be described below with reference to the drawings. Note that, in each of the figures to be referred to in the following description, to illustrate each layer, each member, and the like in a recognizable size in the drawings, each layer, each member, and the like are illustrated at a different scale. Moreover, in the description described below, when a layer formed in a second substrate 10 is described, the upper layer side or the front surface side indicates the side (the side on which a first substrate 20 is positioned) opposite to the side on which a substrate body 19 is positioned, and the bottom layer side indicates the side on which the substrate body 19 is located.

First Exemplary Embodiment

Configuration of Liquid Crystal Device

Figure 2:
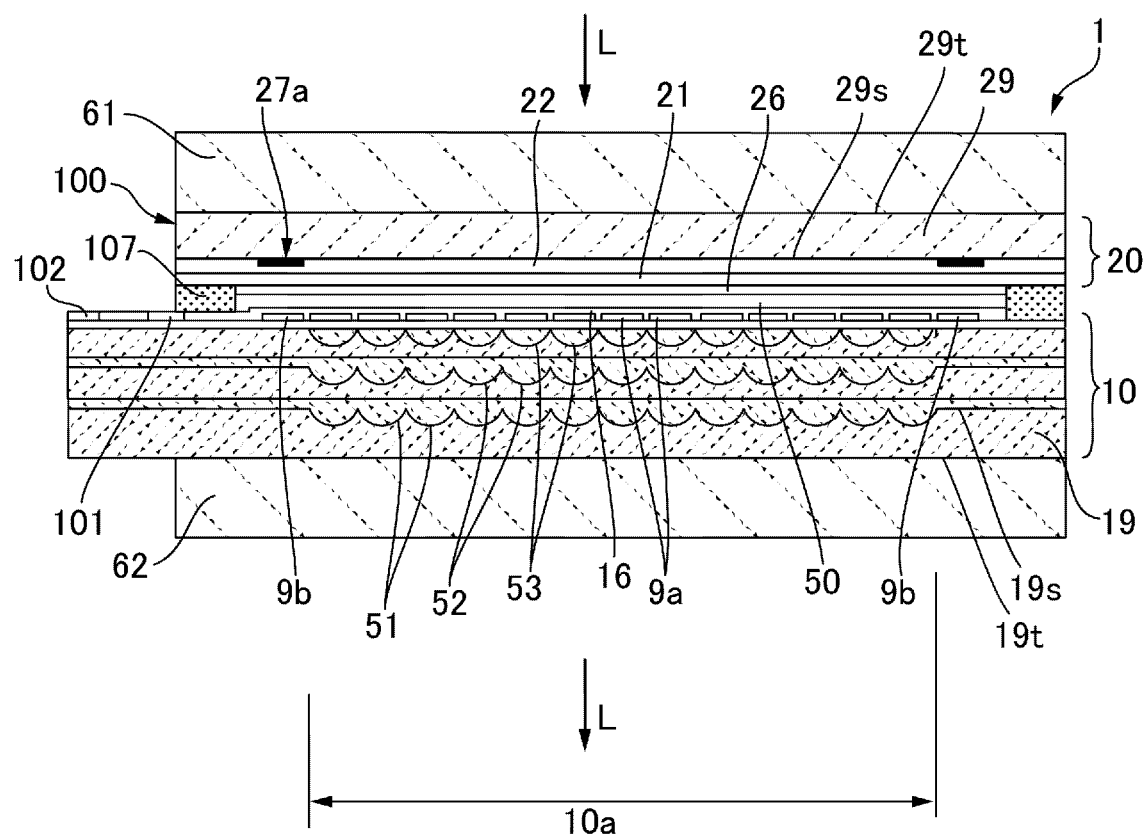
FIG. 2 is an explanatory view schematically illustrating a cross section of a liquid crystal device according to a first exemplary embodiment of the present disclosure.
Figure 3:
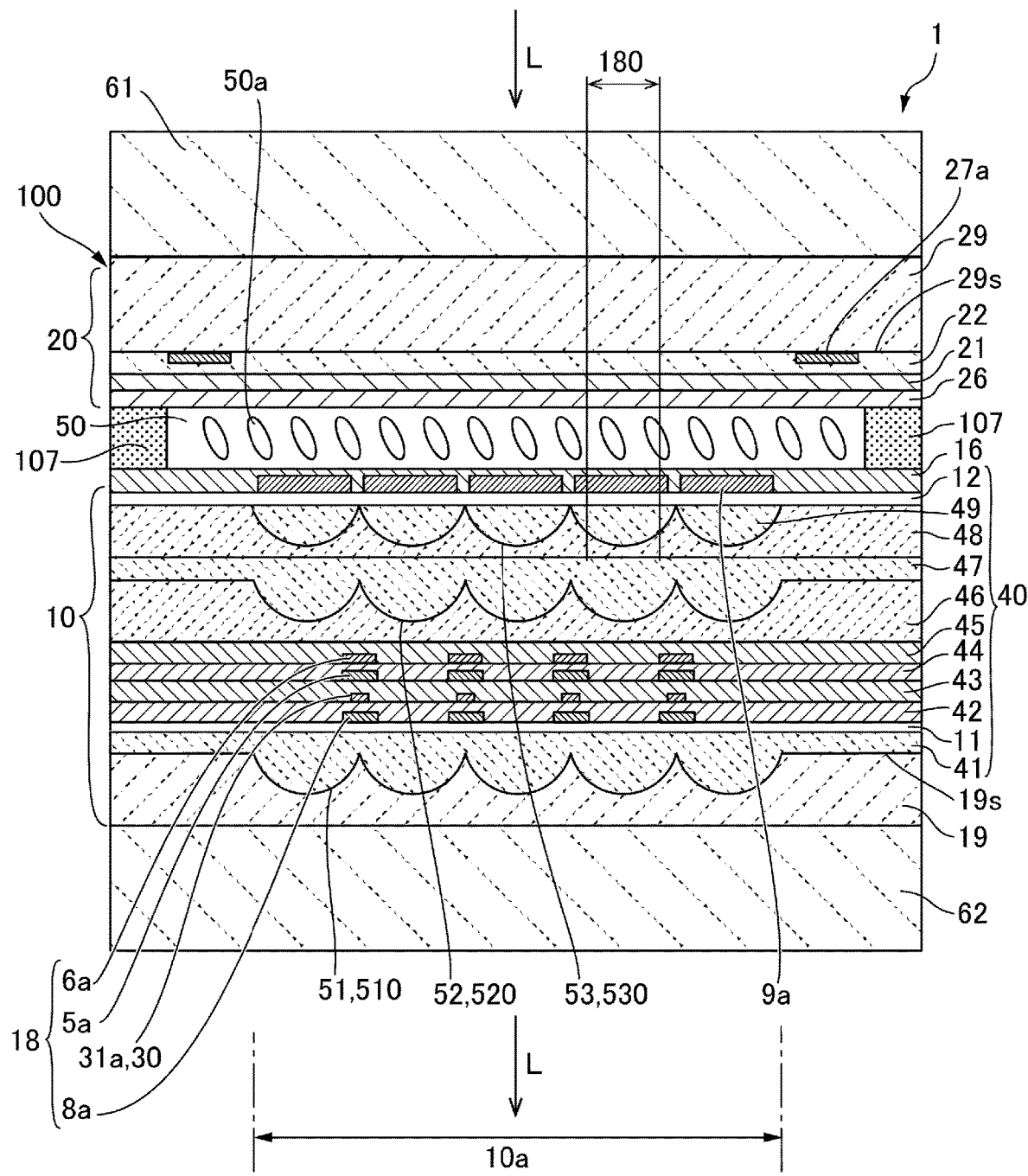
FIG. 3 is an explanatory view illustrating a part of the cross section in an enlarged manner, which is illustrated in FIG. 2.

FIG. 1 is a plan view illustrating an aspect of a liquid crystal panel 100 used in a liquid crystal device 1 to which the present disclosure is applied, and illustrates a state in which the liquid crystal device 1 is viewed from the first substrate 20 side. FIG. 2 is an explanatory diagram schematically illustrating a cross section of the liquid crystal device 1 according to a first exemplary embodiment of the present disclosure. FIG. 3 is an explanatory view illustrating a part of the cross section in an enlarged manner, which is illustrated in FIG. 2.

As illustrated in FIG. 1, FIG. 2, and FIG. 3, the liquid crystal device 1 includes the liquid crystal panel 100 obtained by bonding the first substrate 20 and the second substrate 10 with a predetermined gap therebetween through intermediation of a seal material 107. In the liquid crystal panel 100, the first substrate 20 and the second substrate 10 are opposed to face each other. The seal material 107 is provided along an outer edge of the first substrate 20 to have a frame shape, and a liquid crystal layer 50 is arranged in a region surrounded by the seal material 107 between the first substrate 20 and the second substrate 10. The seal material 107 is a photocurable adhesive, or a photocurable and thermosetting adhesive, and a gap material such as glass fiber or glass beads for setting a distance between the substrates to a predetermined value is compounded in the seal material 107. The first substrate 20 and the second substrate 10 both have a quadrangle shape. In a substantially central portion of the liquid crystal device 1, a display region 10a is provided as a quadrangle region. Correspondingly to the shape, the seal material 107 is also provided in a substantially quadrangle shape.

The first substrate 20 includes a transmissive substrate such as a quartz substrate or a glass substrate as a substrate body 29. On one surface 29s side of the substrate body 29, which faces the second substrate 10, a transmissive counter electrode 21 including, for example, an ITO film is formed. A first alignment film 26 is formed on the second substrate 10 side of the counter electrode 21. The counter electrode 21 is formed on a substantially entire surface of the substrate body 29, and is covered with the first alignment film 26. Therefore, a part from the substrate body 29 to the first alignment film 26 corresponds to the first substrate 20.

A light shielding film 27a formed of a resin, metal, or a metal compound is formed between the substrate body 29 and the counter electrode 21. A transmissive film 22 formed of a silicon oxide film or the like is formed between the light shielding film 27a and the counter electrode 21. The light shielding film 27a is formed, for example, as a partition in a frame-like shape extending along the outer peripheral edge of the display region 10a. Thus, on the first substrate 20, the light shielding film 27a (light shielding member) is not formed in the display region 10a.

The second substrate 10 includes a transmissive substrate such as a quartz substrate or a glass substrate as a substrate body 19. On one surface 19s side of the substrate body 19 on the first substrate 20 side, on an outer side of the display region 10a, a data line driving circuit 101 and a plurality of terminals 102 are formed along one side of the second substrate 10. A scan line driving circuit 104 is formed along other sides adjacent to the one side. A flexible wiring substrate 105 is coupled to the terminals 102, and various potentials and various signals are input to the second substrate 10 via the flexible wiring substrate. Further, in the display region 10a on the one surface 19s of the substrate body 19, a plurality of transmissive pixel electrodes 9a including, for example, an Indium Tin Oxide (ITO) film, and pixel switching elements (not illustrated in FIG. 2) which are electrically coupled to the plurality of pixel electrodes 9a, respectively, are formed in a matrix pattern. A second alignment film 16 is formed on the first substrate 20 side of the pixel electrodes 9a, and the pixel electrodes 9a are covered with the second alignment film 16. Therefore, a part from the substrate body 19 to the second alignment film 16 corresponds to the second substrate 10. In a region of the second substrate 10, which overlaps the partition (light shielding film 27a) in plan view, a dummy pixel electrode 9b, which is concurrently formed with the pixel electrodes 9a, is formed.

The second substrate 10 includes an inter-substrate conduction electrode 109, which is formed to overlap a corner portion of the first substrate 20 on an outer side of the seal material 107, for the purpose of establishing electrical conduction between the second substrate 10 and the first substrate 20. An inter-substrate conduction material 109a including conductive particles is arranged in the inter-substrate conduction electrode 109. The counter electrode 21 of the first substrate 20 is electrically coupled to the second substrate 10 side via the inter-substrate conduction material 109a and the inter-substrate conduction electrode 109. Therefore, a common potential is applied to the counter electrode 21 from the second substrate 10 side.

In the liquid crystal device 1 according to the exemplary embodiment, the pixel electrodes 9a and the counter electrode 21 are made of an ITO film (transmissive conductive film). The liquid crystal device 1 is thus configured as a transmissive liquid crystal device. In the liquid crystal device 1 according to the exemplary embodiment, light that enters the liquid crystal layer 50 from the first substrate 20 side is modulated while passing through the second substrate 10 and being emitted as indicated by an arrow L, and thus an image is displayed. Therefore, the first substrate 20 is provided on a light incident side, and the second substrate 10 faces the first substrate 20 on a light emission side.

Configuration of Liquid Crystal Layer 50 and the Like

The first alignment film 26 and the second alignment film 16 are inorganic alignment films formed of diagonally vapor-deposited films made of $SiO_x$ (x<2), $TiO_2$, MgO, or $Al_2O_3$, for example. Accordingly, the first alignment film 26 and the second alignment film 16 each include a columnar structure layer in which respective columnar bodies each named a column are diagonally formed with respect to both the first substrate 20 and the second substrate 10. Thus, in the first alignment film 26 and the second alignment film 16, liquid crystal molecules 50a, which have negative dielectric anisotropy and are used in the liquid crystal layer 50, are oriented diagonally with respect to the first substrate 20 and the second substrate 10. As a result, the liquid crystal molecules 50a are pre-tilted.

Herein, under a state in which a voltage is not applied between the pixel electrodes 9a and the counter electrode 21, an angle is formed between a direction orthogonal to the second substrate 10 and the first substrate 20 and the major axis direction (alignment direction) of the liquid crystal molecules 50a. Such direction is a pre-tilt angle. In the exemplary embodiment, the pre-tilt angle is 5 degrees, for example.

In this way, the liquid crystal device 1 is configured as a liquid crystal device of a Vertical Alignment (VA) mode. In the liquid crystal device 1, when a voltage is applied between the pixel electrodes 9a and the counter electrode 21, the liquid crystal molecules 50a are displaced in a direction of minimizing the tilt angle with respect to the second substrate 10 and the first substrate 20 in the pre-tilt direction. The direction of such a displacement corresponds to so-called a clear vision direction. In the exemplary embodiment, as illustrated in FIG. 1, when a side coupled to the flexible wiring substrate is 06:00 on a clock, an alignment direction P (clear vision direction) of the liquid crystal molecules 50a is a direction in plan view from 04:30 toward 10:30 on a clock.

Dust-Proof Transmissive Substrate

As illustrated in FIG. 2 and FIG. 3, when the liquid crystal device 1 is used as, for example, a light valve of a projection-type display apparatus described later, on the other surface 29t of the substrate body 29 of the first substrate 20, which is on a side opposite to the second substrate 10, a dust-proof first transmissive substrate 61 is bonded with an adhesive or the like. Further, on the other surface 19t of the substrate body 19 of the second substrate 10, which is on a side opposite to the first substrate 20, a dust-proof second transmissive substrate 62 is bonded with an adhesive or the like. Therefore, foreign matters such as dusts do not adhere directly to the liquid crystal panel 100, and hence foreign matters are prevented from being formed in an image.

Light Shielding Member in Lattice Shape

As illustrated in FIG. 3, in the display region 10a of the second substrate 10, a light shielding member 18 in a lattice shape is provided between the substrate body 19 and the pixel electrodes 9a. In plan view, the light shielding member 18 extends between the adjacent pixel electrodes 9a. In the exemplary embodiment, the light shielding member 18 includes a light shielding film 8a, a scan line 3a, a capacitance line 5a, and a data line 6a, which are described below with reference to FIG. 4 and FIG. 5.

Specific Configuration Example of Pixel

Figure 4:
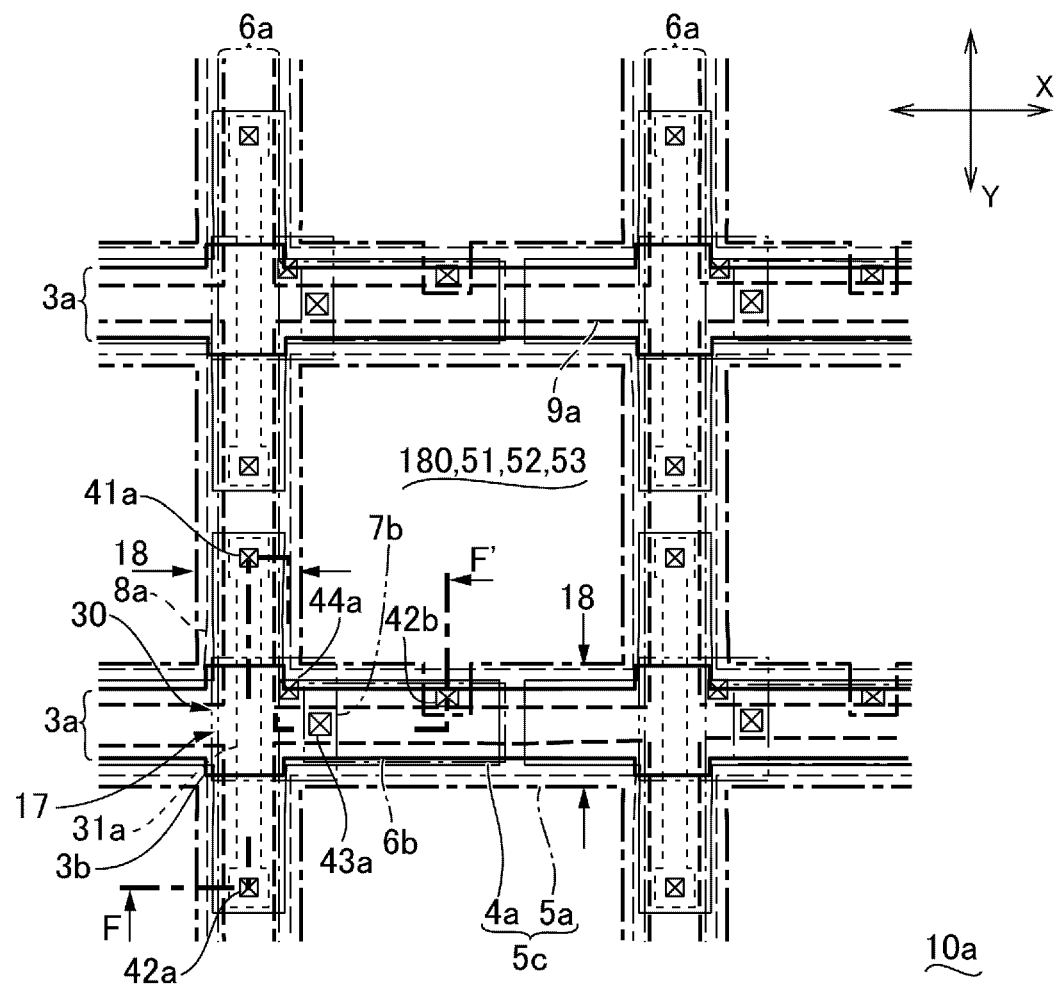
FIG. 4 is a plan view of a plurality of adjacent pixels on the liquid crystal panel illustrated in FIG. 1.
Figure 5:
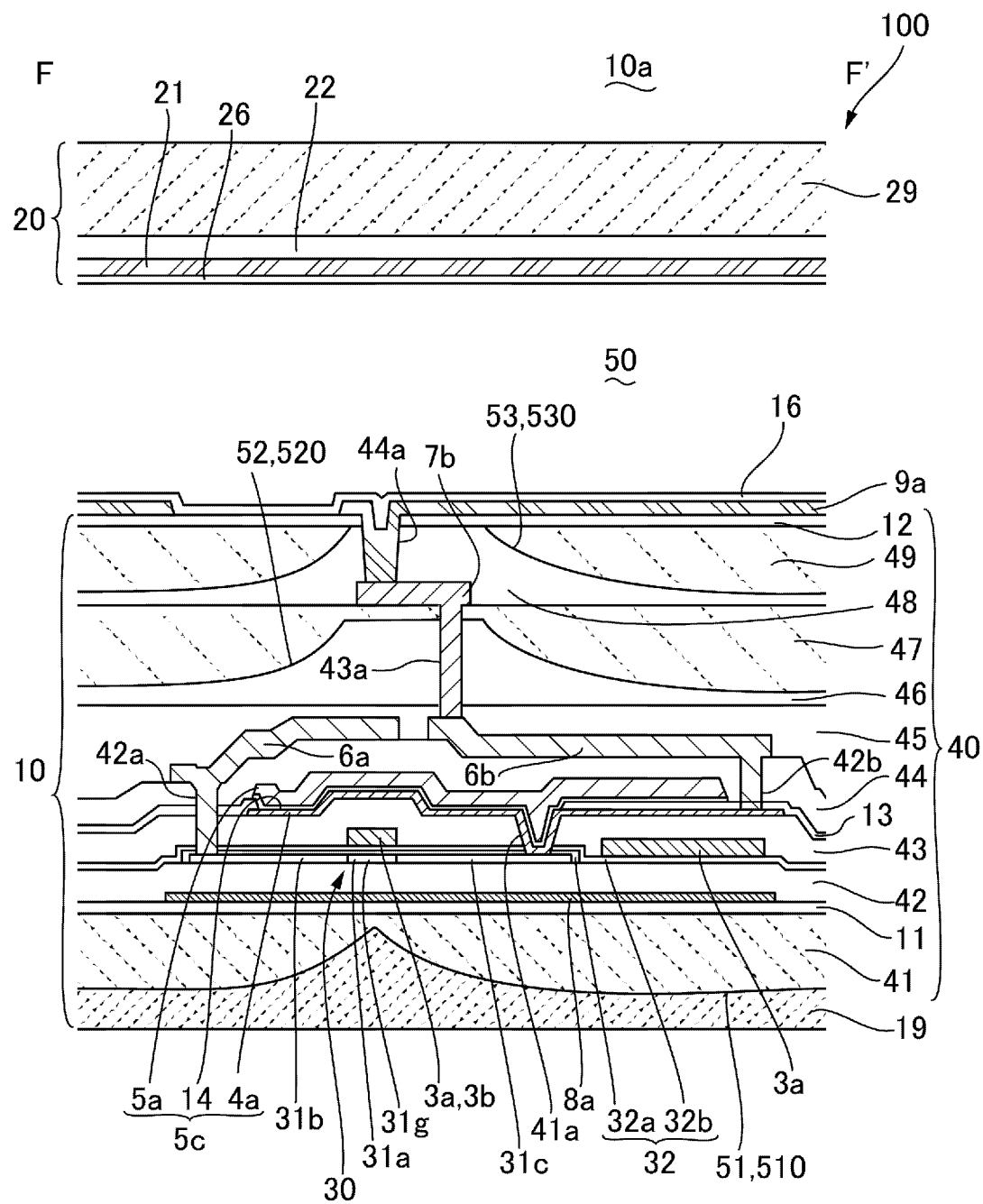
FIG. 5 is a cross-sectional view of the liquid crystal panel illustrated in FIG. 4, which is taken along the line F'-F'.

FIG. 4 is a plan view of a plurality of adjacent pixels on the liquid crystal panel 100 illustrated in FIG. 1. FIG. 5 is a cross-sectional view of the liquid crystal panel 100 illustrated in FIG. 4, which is taken along the line F'-F'. Note that, in FIG. 4, each layer is indicated by a line as described below. Further, as for the layers that have ends overlapping each other in plan view, the positions of the ends are deviated in FIG. 4 for easy understanding of shapes and the like of the layers. Further, in FIG. 5, a contact hole 43a is illustrated at a deviated position.

The light shielding film 8a: a thin and long dashed line
A semiconductor layer 31a: a thin and short dotted line
The scan line 3a: a thick solid line
A drain electrode 4a: a thin solid line
The data line 6a and a relay electrode 6b: a thin long dashed short dashed line
The capacitance line 5a: a thick long dashed short dashed line
A relay electrode 7b: a thin long double-short dashed line
The pixel electrode 9a: a thick dashed line As illustrated in FIG. 4, on a surface of the second substrate 10, which faces the first substrate 20, the pixel electrode 9a is formed in each of the plurality of pixels, and the data lines 6a and the scan lines 3a are formed along inter-pixel regions sandwiched between the adjacent pixel electrodes 9a. The inter-pixel regions extend lengthwise and crosswise. The scan lines 3a linearly extend along first inter-pixel regions of the inter-pixel regions, which extend in an X direction, and the data lines 6a linearly extend along second inter-pixel regions of the inter-pixel regions, which extend in a Y direction. The pixel switching elements 30 are formed in correspondence with intersections between the data lines 6a and the scan lines 3a. In the exemplary embodiment, the pixel switching elements 30 are formed by utilizing intersection regions 17 between the data lines 6a and the scan lines 3a and vicinities of the intersection regions 17. The capacitance lines 5a are formed on the second substrate 10, and a common potential is applied to the capacitance lines 5a. The capacitance lines 5a extend to overlap the scan lines 3a and the data line 6a, and are formed to have a lattice shape. On the bottom layer side of the switching element 30, the light shielding film 8a is formed, and the light shielding film 8a extends in a lattice shape to overlap the scan line 3a and the data line 6a.

As illustrated in FIG. 5, in the display region 10a of the second substrate 10, a first lens member 51 described later is formed on the one surface 19s side of the substrate body 19, and a transmissive insulating film 11 including a silicon oxide film and the like is formed on the upper layer side of the first lens member 51 (on a side opposite to the substrate body 19).

On the upper layer of the insulating film 11, the light shielding film 8a including a conductive film such as a conductive polysilicon film, a metal silicide film, a metal film, or a metal compound film is formed. The light shielding film 8a extends along the scan line 3a and the data line 6a between the substrate body 19 and the switching element 30, and has an opening portion corresponding to a region overlapping the pixel electrode 9a in plan view. The light shielding film 8a includes a light shielding film such as tungsten silicide (WSi), tungsten, or titanium nitride. When light emitted from the second substrate 10 is reflected to enter the second substrate 10 again, the light shielding film 8a prevents the light from entering the semiconductor layer 31a described later and causing an erroneous operation in the switching element 30 due to photoelectric current. The light shielding film 8a may also be constituted as a scan line. In this case, a configuration described below in which a gate electrode 3b and the light shielding film 8a are brought into conduction with each other is obtained.

On the upper layer side of the light shielding film 8a, a transmissive inter-layer insulating film 42 including a silicon oxide film is formed. On the upper layer side of the inter-layer insulating film 42, the switching element 30 including the semiconductor layer 31a is formed. The switching element 30 includes the semiconductor layer 31a and the gate electrode 3b. The semiconductor layer 31a has long sides oriented in an extending direction of the data line 6a. The gate electrode 3b extends in a direction orthogonal to a longitudinal direction of the semiconductor layer 31a, and overlaps a central portion of the semiconductor layer 31a in the longitudinal direction. In the exemplary embodiment, the gate electrode 3b includes a part of the scan line 3a. The switching element 30 includes a transmissive gate insulating film 32 between the semiconductor layer 31a and the gate electrode 3b. The semiconductor layer 31a includes a channel region 31g facing the gate electrode 3b via the gate insulating film 32, and also includes a source region 31b and a drain region 31c on one side and the other side of the channel region 31g, respectively. In the exemplary embodiment, the switching element 30 has an LDD structure. Thus, on both the sides of the channel region 31g, each of the source region 31b and the drain region 31c has a low-concentration region. In a region adjacent to a side opposite to the channel region 31g with respect to the low-concentration region, each of the source region 31b and the drain region 31c has a high-concentration region.

The semiconductor layer 31a includes, for example, a polysilicon film (polycrystalline silicon film). The gate insulating film 32 has a two-layer structure including a first gate insulating film 32a including a silicon oxide film that is obtained by thermally oxidizing the semiconductor layer 31a, and a second gate insulating film 32b including a silicon oxide film that is formed by using, for example, the low pressure CVD method. The gate electrode 3b and the scan line 3a each include a conductive film such as a conductive polysilicon film, a metal silicide film, a metal film, or a metal compound film.

On the upper layer side of the gate electrode 3b, a transmissive inter-layer insulating film 43 including, for example, a silicon oxide film is formed. On an upper layer of the inter-layer insulating film 43, a drain electrode 4a is formed. The drain electrode 4a includes a conductive film such as a conductive polysilicon film, a metal silicide film, a metal film, or a metal compound film. The drain electrode 4a is formed to have a part overlapping the drain region 31c of the semiconductor layer 31a, and is brought into conduction with the drain region 31c via a contact hole 41a passing through the inter-layer insulating film 43 and the gate insulating film 32.

On the upper layer side of the drain electrode 4a, a transmissive etching stopper layer 13 including, for example, a silicon oxide film and a transmissive dielectric layer 14 are formed. On the upper layer side of the dielectric layer 14, the capacitance line 5a is formed. As the dielectric layer 14, a silicon compound such as a silicon oxide film or a silicon nitride film may be used. The capacitance line 5a includes a conductive film such as a conductive polysilicon film, a metal silicide film, a metal film, or a metal compound film. The capacitance line 5a overlaps the drain electrode 4a via the dielectric layer 14, and forms a retention capacitor 5c.

On the upper layer side of the capacitance line 5a, the transmissive inter-layer insulating film 44 including, for example, a silicon oxide film is formed. On the upper layer side of the inter-layer insulating film 44, the data line 6a and the relay electrode 6b are formed of the same conductive film. The data line 6a and the relay electrode 6b each include a conductive film such as a conductive polysilicon film, a metal silicide film, a metal film, or a metal compound film. The data line 6a is brought into conduction with the source region 31b via a contact hole 42a passing through the inter-layer insulating film 44, the etching stopper layer 13, the inter-layer insulating film 42, and the gate insulating film 32. The relay electrode 6b is in conduction with the drain electrode 4a via a contact hole 42b passing through the inter-layer insulating film 44 and the etching stopper layer 13.

On the upper layer side of each of the data line 6a and the relay electrode 6b, an inter-layer insulating film 45, an inter-layer insulating film 46, and a transmissive film 47, which are transmissive and include, for example, a silicon oxide film, are formed. On the upper layer side of the transmissive film 47, the relay electrode 7b is formed. The relay electrode 7b includes a conductive film such as a conductive polysilicon film, a metal silicide film, a metal film, or a metal compound film. The relay electrode 7b is in conduction with the relay electrode 6b via the contact hole 43a passing through the transmissive film 47, the inter-layer insulating film 46, and the inter-layer insulating film 45.

On the upper layer side of the relay electrode 7b, a transmissive inter-layer insulating film 48 including, for example, a silicon oxide film is formed. On the upper layer side of the inter-layer insulating film 48, the pixel electrode 9a including, for example, an ITO film is formed. A contact hole 44a reaching the relay electrode 7b is formed in the inter-layer insulating film 48. The pixel electrode 9a is electrically coupled to the relay electrode 7b via the contact hole 44a. As a result, the pixel electrode 9a is electrically coupled to the drain region 31c of the switching element 30 via the relay electrode 7b, the relay electrode 6b, and the drain electrode 4a. The inter-layer insulating film 48 includes a flattened surface. On the surface side of the pixel electrode 9a, the transmissive second alignment film 16 including a polyimide or an inorganic alignment film is formed.

In the exemplary embodiment, a protection layer 12 including a boron-doped silicate glass (BSG film) is formed between the inter-layer insulating film 48 and the pixel electrode 9a. Therefore, the contact hole 44a passes through the protection layer 12 and the inter-layer insulating film 48, and reaches the relay electrode 7b. Note that, in the inner portion of the contact hole 44a, the pixel electrode 9a is electrically coupled to the relay electrode 7b on the bottom of the contact hole 44a. A configuration in which the inner portion of the contact hole 44a is filled with a metal film such as tungsten as a plug and the pixel electrode 9a is coupled to the relay electrode 7b via the plug in the inner portion of the contact hole 44a may be adopted.

Configuration of Lens Members of First Substrate 20

As illustrated in FIG. 3, in the display region 10a of the second substrate 10, the first lens member 51 is provided at the layer between the substrate body 19 and the light shielding member 18, and the second lens member 52 is provided at the layer between the light shielding member 18 and the pixel electrode 9a. Further, in the display region 10a of the second substrate 10, the third lens member 53 is provided at the layer between the second lens member 52 and the pixel electrode 9a. Each of the first lens member 51, the second lens member 52, and the third lens member 53 overlaps the pixel electrode 9a in plan view. Each of the first lens member 51, the second lens member 52, and the third lens member 53 is formed by use of a plurality of transmissive films 40 provided between the substrate body 19 and the pixel electrode 9a.

More specifically, as illustrated in FIG. 3 and FIG. 5, on the one surface 19s of the substrate body 19, a plurality of lens surfaces 510, which are concave surfaces and overlap the plurality of pixel electrodes 9a respectively in plan view, are formed. Further, a transmissive film 41 (lens layer) is laminated on the one surface 19s of the substrate body 19, and a surface of the transmissive film 41, which is on a side opposite to the substrate body 19, is a flattened surface. The substrate body 19 and the transmissive film 41 are different in a refractive index, and the lens surfaces 510 constitute the lens surface of the first lens member 51. In the exemplary embodiment, the transmissive film 41 has the refractive index larger than the refractive index of the substrate body 19. For example, the substrate body 19 is formed of a quartz substrate (silicon oxide, $SiO_2$), and has the refractive index of 1.48. Meanwhile, the transmissive film 41 is formed of a silicon oxynitride film (SiON), and has the refractive index from 1.58 to 1.68. Thus, the first lens member 51 has positive power for converging light. In the exemplary embodiment, on the upper layer side of the transmissive film 41, the insulating film 11 is formed.

On a surface of the inter-layer insulating film 46, which is on a side opposite to the substrate body 19, a plurality of lens surfaces 520, which are concave surfaces and overlap the plurality of pixel electrodes 9a respectively in plan view, are formed between the light shielding member 18 and the pixel electrode 9a. Further, on a surface of the inter-layer insulating film 46, which is on a side opposite to the substrate body 19, the transmissive film 47 (lens layer) is laminated, and the transmissive film 47 has a surface, which is on a side opposite to the substrate body 19, is a flattened surface. The inter-layer insulating film 46 and the transmissive film 47 are different in a refractive index, and the lens surfaces 520 constitute the lens surface of the second lens member 52. In the exemplary embodiment, the transmissive film 47 has the refractive index larger than the refractive index of the inter-layer insulating film 46. For example, the inter-layer insulating film 46 is a silicon oxide (refractive index=1.48). Meanwhile, the transmissive film 47 is a silicon oxynitride film (refractive index=1.58 to 1.68). Thus, the second lens member 52 has positive power for converging light.

On a surface of the inter-layer insulating film 48, which is on a side opposite to the substrate body 19, a plurality of lens surfaces 530, which are concave surfaces and overlap the plurality of pixel electrodes 9a respectively in plan view, are formed between the second lens member 52 and the pixel electrode 9a. Further, on the surface of the inter-layer insulating film 48, which is on the side opposite to the substrate body 19, a transmissive film 49 (lens layer) is laminated. In the exemplary embodiment, for example, the transmissive film 49 forms a surface continuous to the inter-layer insulating film 48. The inter-layer insulating film 48 and the transmissive film 49 are different in a refractive index, and the lens surfaces 530 constitute the lens surface of the third lens member 53. In the exemplary embodiment, the transmissive film 49 has the refractive index larger than the refractive index of the inter-layer insulating film 48. For example, the inter-layer insulating film 48 is a silicon oxide (refractive index=1.48). Meanwhile, the transmissive film 49 is a silicon oxynitride film (refractive index=1.58 to 1.68). Thus, the third lens member 53 has positive power for converging light.

Actions and Main Effects of Present Exemplary Embodiment

As described above, on the second substrate 10 of the liquid crystal device 1 according to the exemplary embodiment, on the liquid crystal layer 50 side of the light shielding member 18 in a lattice shape, the second lens member 52 is formed between the light shielding member 18 and the pixel electrode 9a, and the third lens member 53 is formed between the second lens member 52 and the pixel electrode 9a. Thus, of the light passing through the liquid crystal layer 50, light toward the light shielding member 18 is efficiently guided to a transmissive region 180 surrounded by the light shielding member 18. Thus, an amount of light emitted from the liquid crystal device 1 can be increased, and hence a bright image can be displayed.

Further, in the second substrate 10, the first lens member 51 is provided between the light shielding member 18 in a lattice shape and the substrate body 19. Thus, a tilt of a light beam emitted from the liquid crystal device 1 can be optimized by the first lens member 51. Therefore, when the liquid crystal device 1 is used in a light valve of a projection-type display apparatus described later, vignetting due to a projection optical system can be suppressed. Thus, a bright image with high quality can be displayed.

Second Exemplary Embodiment

Figure 6:
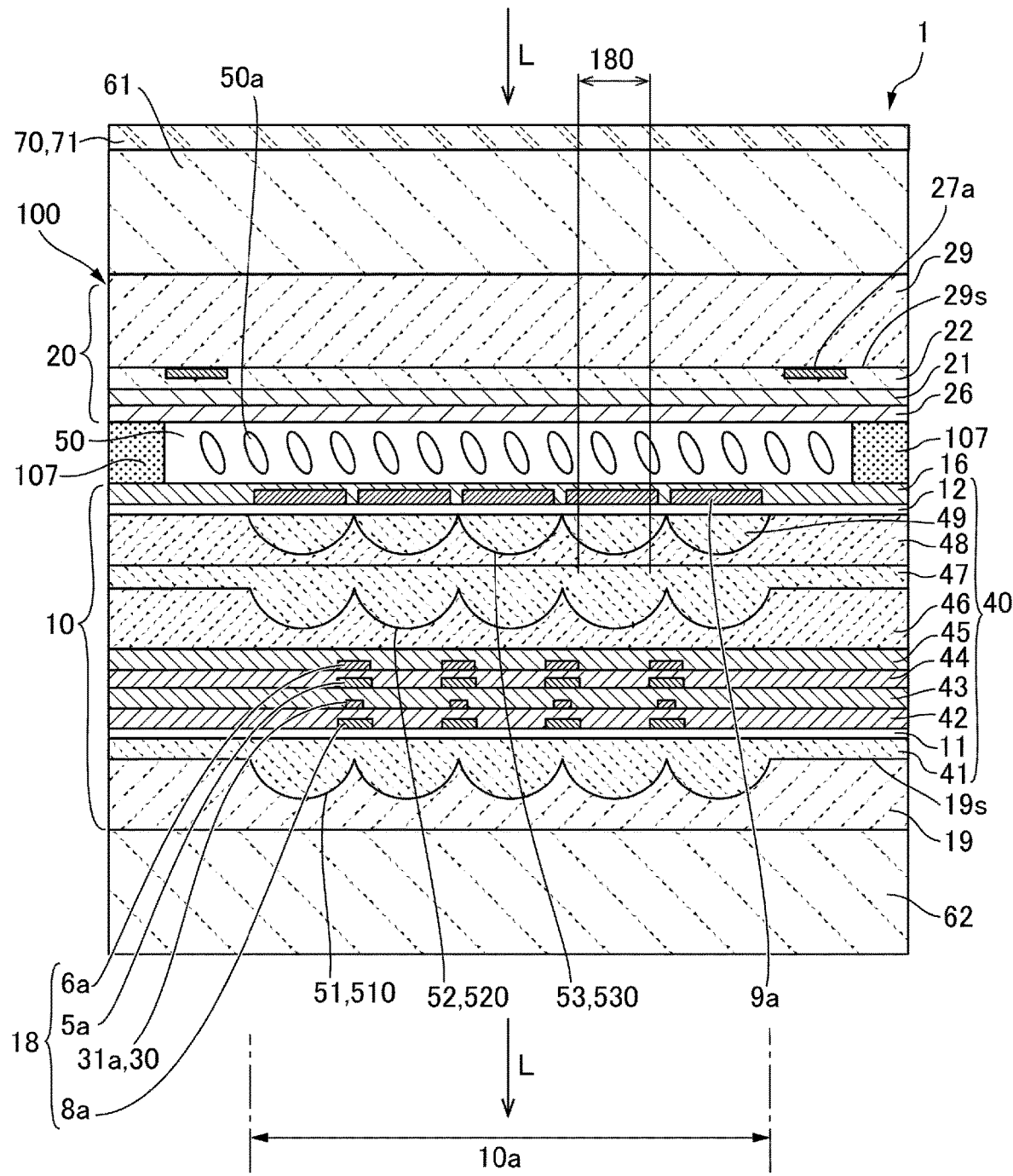
FIG. 6 is an explanatory view of a liquid crystal device according to a second embodiment according to the present disclosure.

FIG. 6 is an explanatory view of the liquid crystal device 1 according to a second embodiment according to the present disclosure. In FIG. 6, the cross section of the liquid crystal device 1 is schematically illustrated in an enlarged manner. Note that, the basic configurations in the exemplary embodiment are similar to those in the first exemplary embodiment, and thus, common portions are assigned identical reference signs and a description thereof will be omitted.

As illustrated in FIG. 6, similarly to the first exemplary embodiment, in the liquid crystal device 1 according to the exemplary embodiment, the second substrate 10 is provided with the first lens member 51, the second lens member 52, and the third lens member 53. Thus, similarly to the first exemplary embodiment, effects such as display of a bright image can be exerted.

Further, the liquid crystal device 1 according to the exemplary embodiment is provided with an optical compensation member 70. Therefore, contrast, visual field angle characteristics, and the like can be improved. In the exemplary embodiment, the optical compensation member 70 is provided on a light incident side of the third lens member 53. Further, the optical compensation member 70 is provided on a light incident side of the first substrate 20. More specifically, the optical compensation member 70 is provided on the surface of the first transmissive substrate 61 bonded to the first substrate 20, which is on a side opposite to the first substrate 20.

As described above, in the liquid crystal device 1 according to the exemplary embodiment, the optical compensation member 70 is provided on a light incident side of the third lens member 53. Thus, the light shielding member 18 in a lattice shape or a lens each of which has a diffraction effect is not present between the liquid crystal layer 50 and the optical compensation member 70. Therefore, between a light beam entering the optical compensation member 70 and a light beam passing through the liquid crystal layer 50, angle deviation due to diffraction at the light shielding member 18 or the lens is less likely to be caused. Thus, an optical compensation effect is high.

Here, the optical compensation member 70 includes at least any one of an optical compensation member having a negative uniaxial refractive index anisotropy, an optical compensation member having a positive uniaxial refractive index anisotropy, and an optical compensation member having a uniaxial or biaxial refractive index ellipsoid inclined with respect to one surface of the substrate body 29 of the first substrate 20. For example, the optical compensation member 70 includes any one of an A plate, a C plate, or an O plate. For example, the optical compensation member 70 includes an inorganic film 71 formed on the first transmissive substrate 61. The optical compensation member 70 is defined below in terms of an refractive index ellipsoid (three-dimensional distribution of a refractive index).

A coordinate axis of the substrate surface of the second substrate 10 or the first substrate 20 corresponds to an xy axis, and a normal line direction corresponds to a z axis. A main refractive index in the x axis direction corresponds to Nx, a main refractive index in the y direction corresponds to Ny, and a main refractive index in the z direction corresponds to Nz.

The A plate (positive A plate) satisfies the following conditional expression:

$$Nx > Ny = Nz$$

The C plate (negative C plate) satisfies the following conditional expression:

$$Nx = Ny > Nz$$ The C plate described above has an optical axis oriented to a normal line with respect to the second substrate 10 and the first substrate 20. The optical axis is optically isotropic in the substrate surface, but is optically anisotropy in a surface orthogonal to the substrate surface. Therefore, a phase difference of light that entering the liquid crystal layer 50 in a diagonal direction can be compensated by the optical compensation member 70. Thus, contrast, visual field angle characteristics, and the like can be improved.

The C plate includes an inorganic film obtained by alternatingly laminating a high-refractive index layer and a low-refractive index layer, for example. The high-refractive index layer includes a tantalum oxide film, a niobium oxide film, a titanium oxide film, a silicon nitride film, a silicon oxynitride film, or the like. For example, the high-refractive index layer is formed of a niobium oxide film having a refractive index of 2.3, and the low-refractive index layer is formed of a silicon oxide film having a refractive index of 1.5.

Regarding the O plate, the refractive index ellipsoid itself is inclined with respect to the substrate. The O plate is inclined at a certain angle from the substrate normal line with the Y axis as a rotary axis with respect to Nx>Ny>Nz, for example. Therefore, the O plate has an optical axis oriented to a diagonal direction deviated from a normal line with respect to the second substrate 10 and the first substrate 20. The optical axis is optically anisotropy in the substrate surface and a surface orthogonal to the substrate surface. Two O plates may be arranged. In this case, the two O plates have optical axes oriented to different directions as seen from the substrate normal line direction. The alignment direction P of the liquid crystal molecules 50a is positioned within an angle range sandwiched between the optical axes of the two O plates. The O plate is formed by subjecting an inorganic film such as a titanium oxide film to diagonal vapor-deposition.

The refractive index characteristics, the thickness, and the like of the optical compensation member 70 is set in such a way to suitably compensate an overall phase difference.

Note that, in the exemplary embodiment, a member such as a substrate formed of sapphire or aluminum, which has a negative uniaxial refractive index ellipsoid being inclined, may be used as the optical compensation member 70. In this case, a mode in which the optical compensation member 70 is bonded to the first transmissive substrate 61 or a mode in which the optical compensation member 70 is not bonded but is caused to face the first transmissive substrate 61 may be adopted.

Third Exemplary Embodiment

Figure 7:
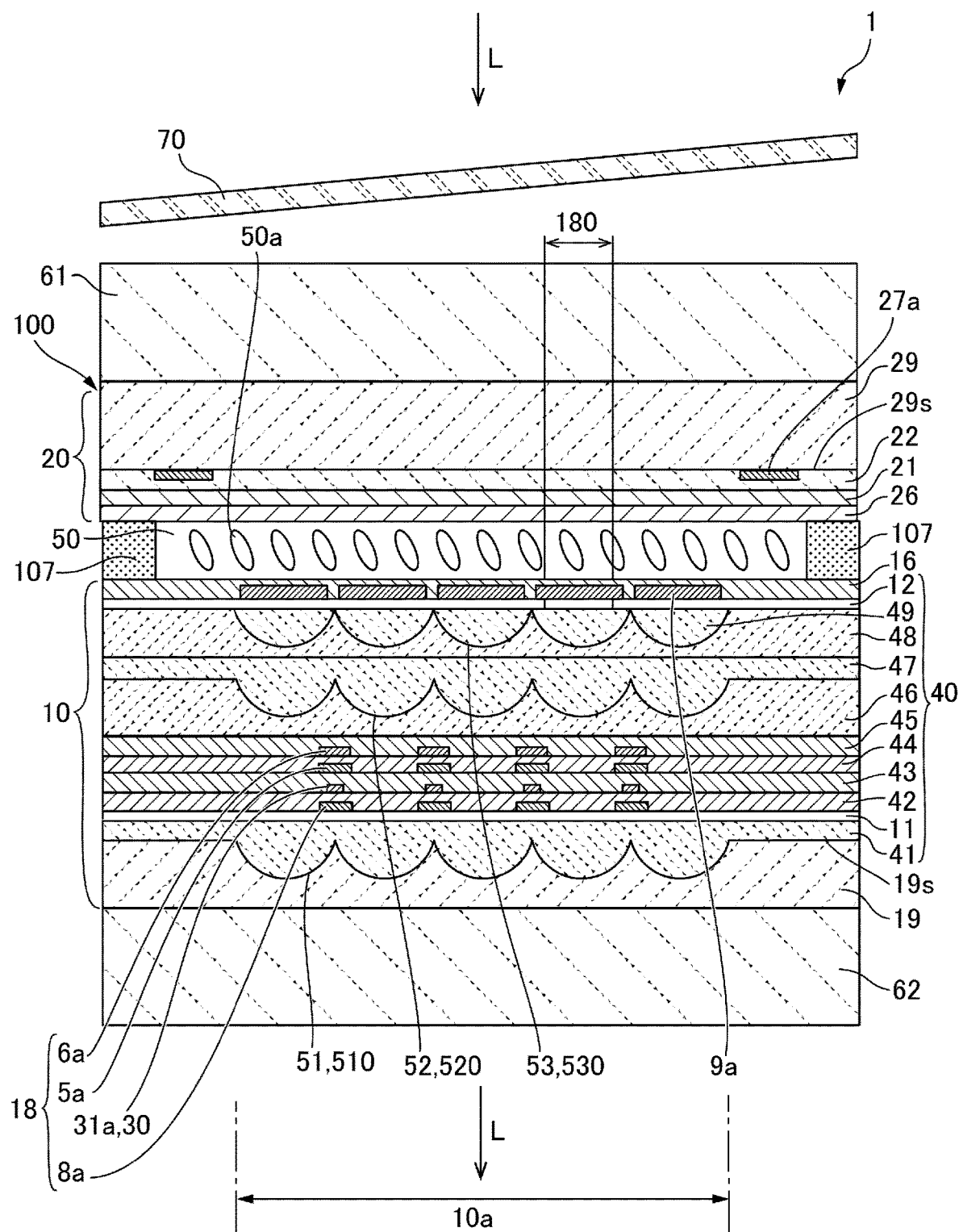
FIG. 7 is an explanatory view of a liquid crystal device according to a third embodiment of the present disclosure.

FIG. 7 is an explanatory view of the liquid crystal device 1 according to a third embodiment of the present disclosure. In FIG. 7, the cross section of the liquid crystal device 1 is schematically illustrated in an enlarged manner. Note that, the basic configurations in the exemplary embodiment are similar to those in the first exemplary embodiment, and thus, common portions are assigned identical reference signs and a description thereof will be omitted.

As illustrated in FIG. 7, similarly to the first exemplary embodiment, in the liquid crystal device 1 according to the exemplary embodiment, the second substrate 10 is provided with the first lens member 51, the second lens member 52, and the third lens member 53. Thus, similarly to the first exemplary embodiment, effects such as display of a bright image can be exerted. Further, similarly to the second exemplary embodiment, the liquid crystal device 1 according to the exemplary embodiment is provided with the optical compensation member 70. Therefore, contrast, visual field angle characteristics, and the like can be improved.

Similarly in the second exemplary embodiment, in the exemplary embodiment, the optical compensation member 70 is also provided on a light incident side of the third lens member 53. The optical compensation member 70 is provided on a light incident side of the first substrate 20. More specifically, the optical compensation member 70 is the C plate, and is arranged diagonally to the first substrate 20 on a side opposite to the first substrate 20 with respect to the first transmissive substrate 61. Therefore, the light shielding member 18 in a lattice shape or a lens each of which has a diffraction effect is not present between the liquid crystal layer 50 and the optical compensation member 70. Thus, an optical compensation effect is highly exerted.

Fourth Exemplary Embodiment

Figure 8:
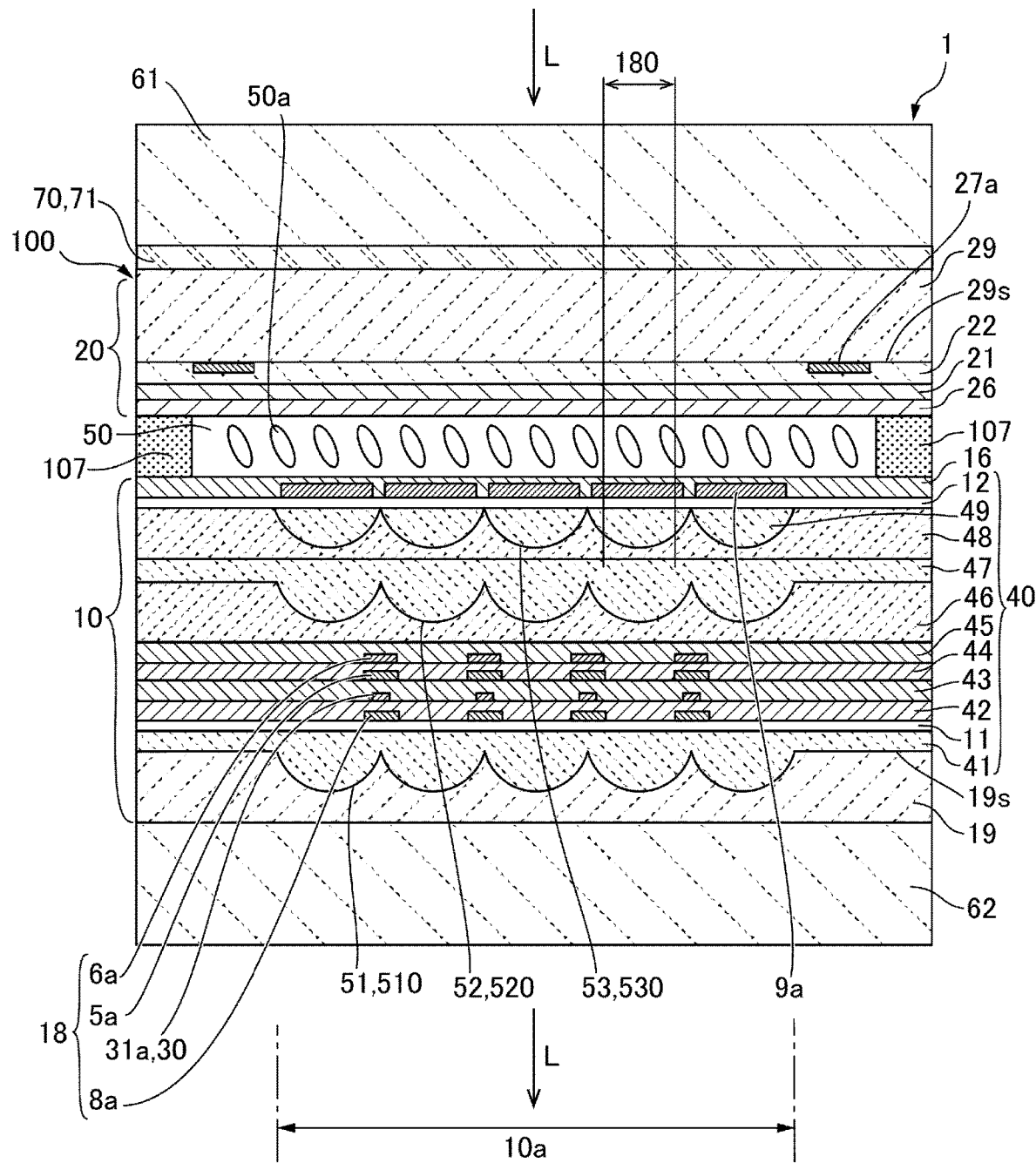
FIG. 8 is an explanatory view of a liquid crystal device according to a fourth embodiment of the present disclosure.

FIG. 8 is an explanatory view of the liquid crystal device 1 according to a fourth embodiment of the present disclosure. In FIG. 8, the cross section of the liquid crystal device 1 is schematically illustrated in an enlarged manner. Note that he basic configurations in the exemplary embodiment and fifth, sixth, and seventh exemplary embodiments described later are similar to those in the first and second exemplary embodiments, and thus, common portions are assigned identical reference signs and a description thereof will be omitted.

As illustrated in FIG. 8, similarly to the first exemplary embodiment, in the liquid crystal device 1 according to the exemplary embodiment, the second substrate 10 is provided with the first lens member 51, the second lens member 52, and the third lens member 53. Thus, similarly to the first exemplary embodiment, effects such as display of a bright image can be exerted. Further, similarly to the second exemplary embodiment, the liquid crystal device 1 according to the exemplary embodiment is provided with the optical compensation member 70. Therefore, contrast, visual field angle characteristics, and the like can be improved.

Similarly in the second exemplary embodiment, in the exemplary embodiment, the optical compensation member 70 is also provided on a light incident side of the third lens member 53. Further, the optical compensation member 70 is provided on a light incident side of the second substrate 10. In the exemplary embodiment, the optical compensation member 70 is provided between the first substrate 20 and the first transmissive substrate 61. For example, the optical compensation member 70 is the inorganic film 71 formed on the surface of the first transmissive substrate 61, which is on the first substrate 20 side. In the first transmissive substrate 61, the inorganic film 71 and the first substrate 20 are bonded. Further, the optical compensation member 70 may be the inorganic film 71 formed on the surface of the first substrate 20, which is on the first transmissive substrate 61 side. In this case, the first transmissive substrate 61 and the inorganic film 71 are bonded. In both the cases, the light shielding member 18 in a lattice shape or a lens each of which has a diffraction effect is not present between the liquid crystal layer 50 and the optical compensation member 70. Thus, an optical compensation effect is highly exerted.

Fifth Exemplary Embodiment

Figure 9:
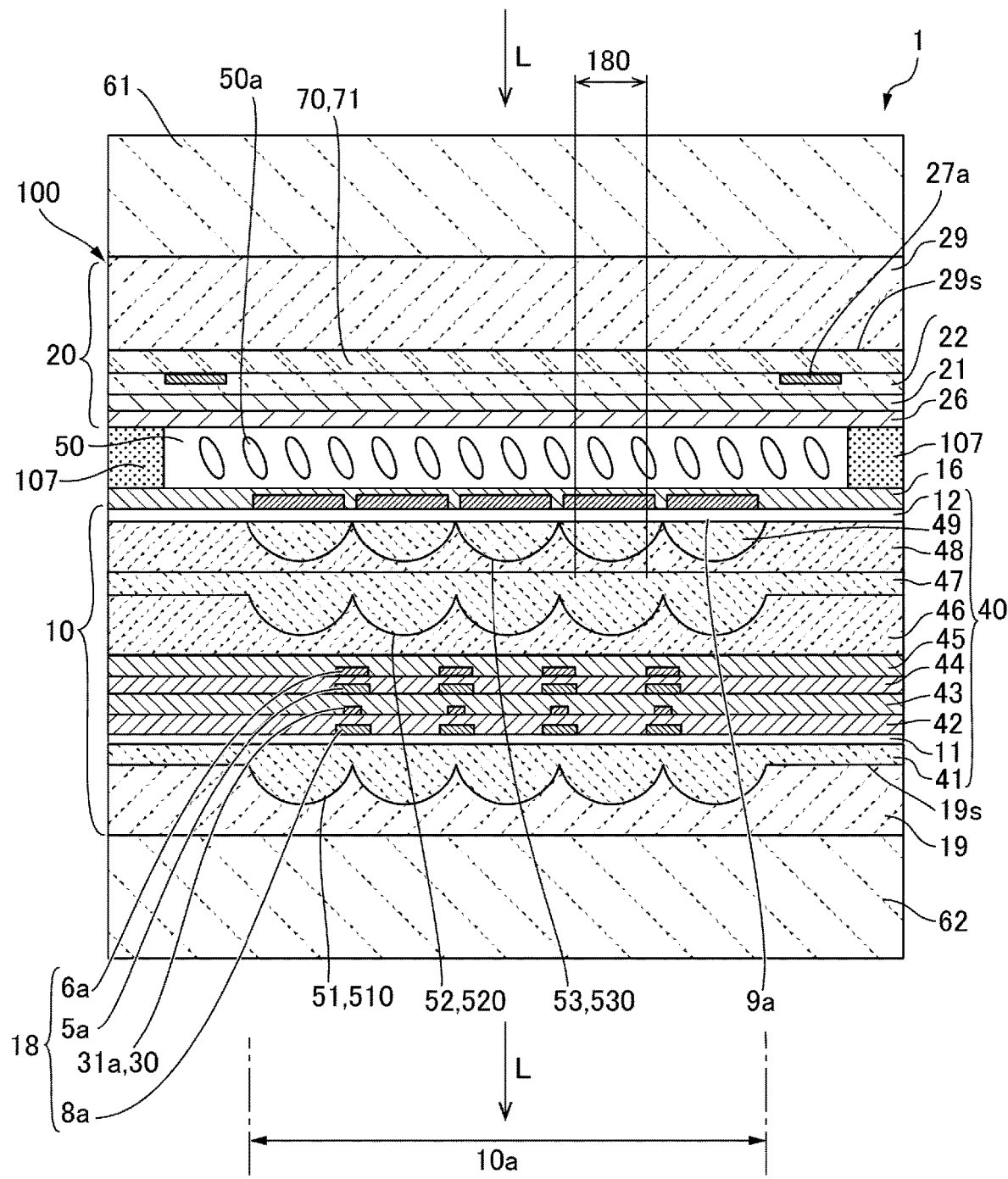
FIG. 9 is an explanatory view of a liquid crystal device according to a fifth embodiment of the present disclosure.

FIG. 9 is an explanatory view of the liquid crystal device 1 according to a fifth embodiment of the present disclosure. In FIG. 9, the cross section of the liquid crystal device 1 is schematically illustrated in an enlarged manner. As illustrated in FIG. 9, similarly to the first exemplary embodiment, in the liquid crystal device 1 according to the exemplary embodiment, the second substrate 10 is provided with the first lens member 51, the second lens member 52, and the third lens member 53. Thus, similarly to the first exemplary embodiment, effects such as display of a bright image can be exerted. Further, similarly to the second exemplary embodiment, the liquid crystal device 1 according to the exemplary embodiment is provided with the optical compensation member 70. Therefore, contrast, visual field angle characteristics, and the like can be improved.

Similarly in the second exemplary embodiment, in the exemplary embodiment, the optical compensation member 70 is also provided on a light incident side of the third lens member 53. In the exemplary embodiment, the optical compensation member 70 is the inorganic film 71 formed between the counter electrode 21 and the substrate body 29 of the first substrate 20. More specifically, the optical compensation member 70 is formed between the substrate body 29 of the first substrate 20 and the transmissive film 22. Therefore, the light shielding member 18 in a lattice shape or a lens each of which has a diffraction effect is not present between the liquid crystal layer 50 and the optical compensation member 70. Thus, an optical compensation effect is highly exerted. Note that the optical compensation member 70 may be formed between the transmissive film 22 and the counter electrode 21. Further, the optical compensation member 70 may be formed of the transmissive film 22.

Sixth Exemplary Embodiment

Figure 10:
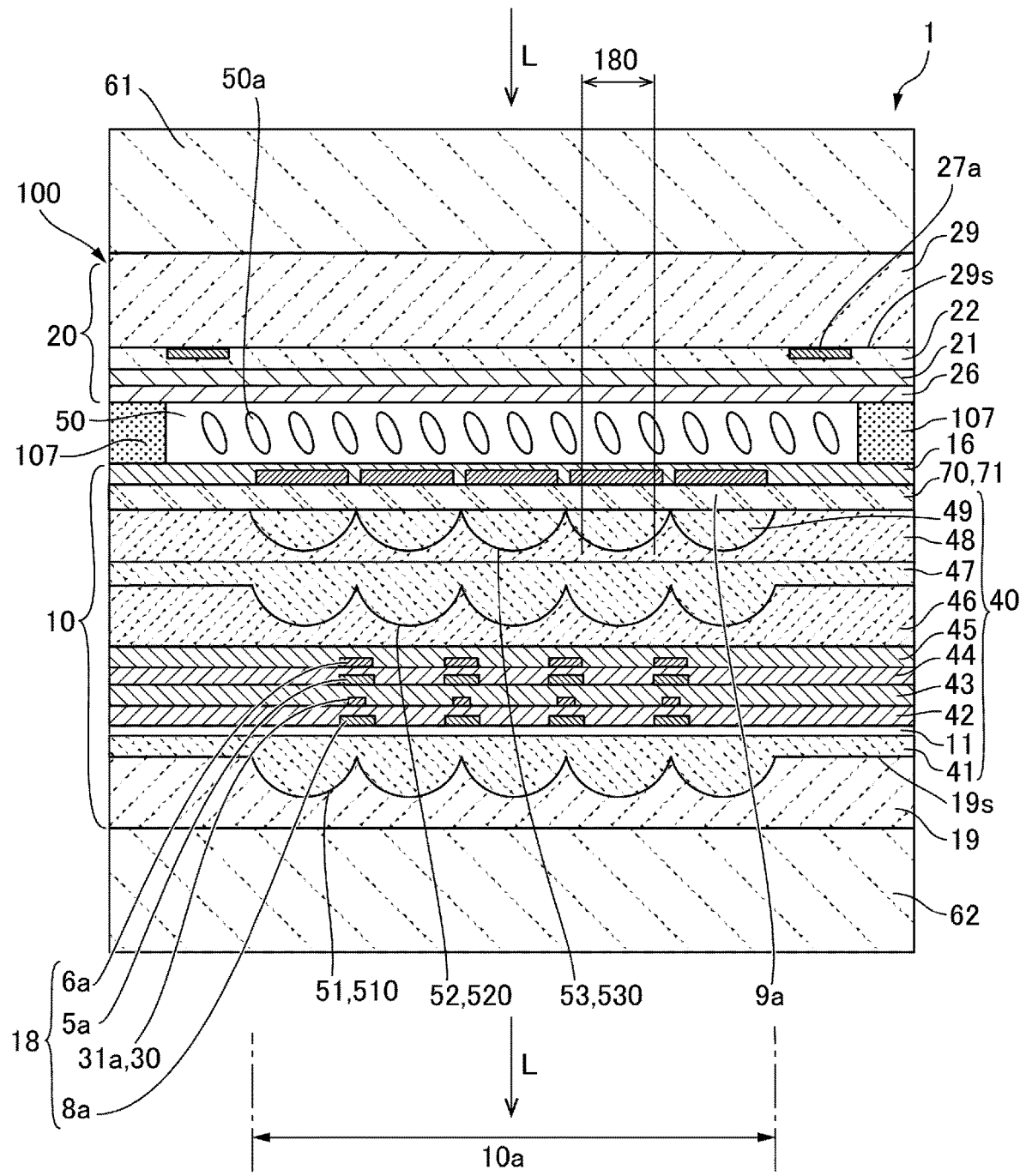
FIG. 10 is an explanatory view of a liquid crystal device according to a sixth embodiment of the present disclosure.

FIG. 10 is an explanatory view of the liquid crystal device 1 according to a sixth embodiment of the present disclosure. In FIG. 10, the cross section of the liquid crystal device 1 is schematically illustrated in an enlarged manner. As illustrated in FIG. 10, similarly to the first exemplary embodiment, in the liquid crystal device 1 according to the exemplary embodiment, the second substrate 10 is provided with the first lens member 51, the second lens member 52, and the third lens member 53. Thus, similarly to the first exemplary embodiment, effects such as display of a bright image can be exerted. Further, similarly to the second exemplary embodiment, the liquid crystal device 1 according to the exemplary embodiment is provided with the optical compensation member 70. Therefore, contrast, visual field angle characteristics, and the like can be improved.

Similarly in the second exemplary embodiment, in the exemplary embodiment, the optical compensation member 70 is also provided on a light incident side of the third lens member 53. In the exemplary embodiment, the optical compensation member 70 is the inorganic film 71 formed between the third lens member 53 and the pixel electrode 9a. Therefore, the light shielding member 18 in a lattice shape or a lens each of which has a diffraction effect is not present between the liquid crystal layer 50 and the optical compensation member 70. Thus, an optical compensation effect is highly exerted.

Seventh Exemplary Embodiment

Figure 11:
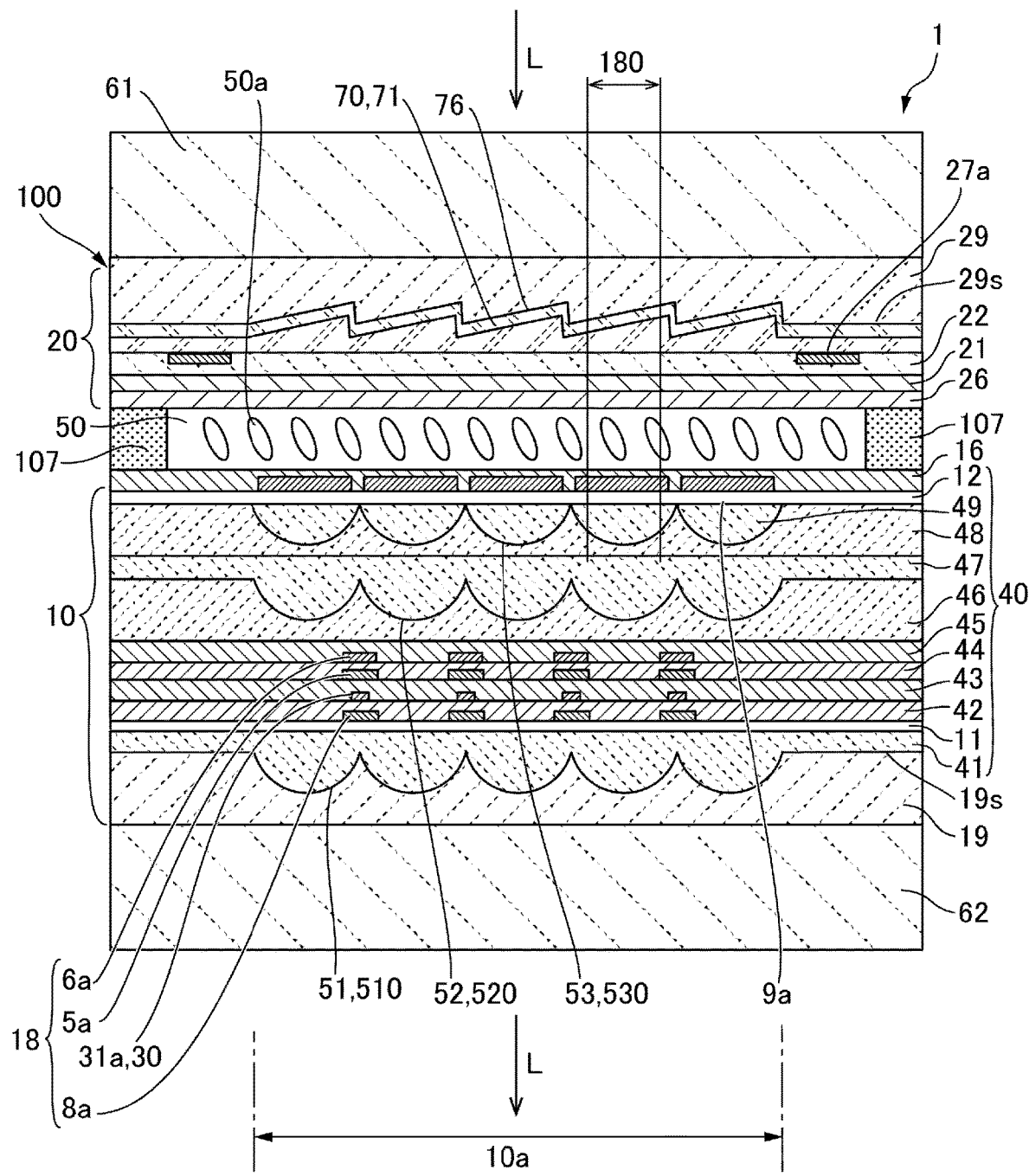
FIG. 11 is an explanatory view of a liquid crystal device according to a seventh embodiment of the present disclosure.
Figure 12:
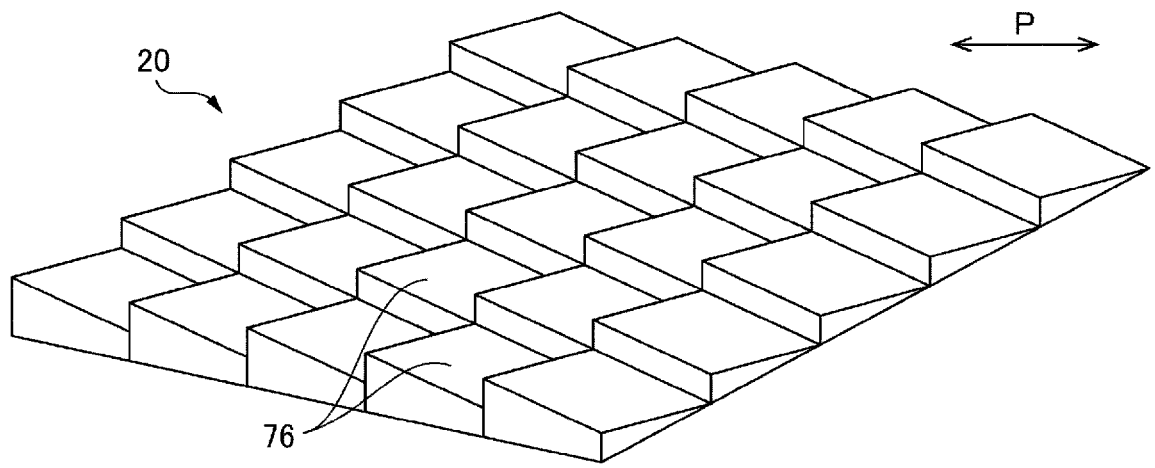
FIG. 12 is an explanatory view of an inclined surface illustrated in FIG. 11.

FIG. 11 is an explanatory view of the liquid crystal device 1 according to a seventh embodiment of the present disclosure. In FIG. 11, the cross section of the liquid crystal device 1 is schematically illustrated in an enlarged manner. FIG. 12 is an explanatory view of inclined surfaces 76 illustrated in FIG. 11.

As illustrated in FIG. 11, similarly to the first exemplary embodiment, in the liquid crystal device 1 according to the exemplary embodiment, the second substrate 10 is provided with the first lens member 51, the second lens member 52, and the third lens member 53. Thus, similarly to the first exemplary embodiment, effects such as display of a bright image can be exerted. Further, similarly to the second exemplary embodiment, the liquid crystal device 1 according to the exemplary embodiment is provided with the optical compensation member 70. Therefore, contrast, visual field angle characteristics, and the like can be improved.

Similarly in the second exemplary embodiment, in the exemplary embodiment, the optical compensation member 70 is also provided on a light incident side of the third lens member 53. When the optical compensation member 70 is formed, for example, inclined surfaces 76 are formed on the one surface 29s of the substrate body 29 in such a way to correspond to the plurality of pixel electrodes 9a respectively. The inorganic film 71 forming the optical compensation member 70 is formed in a substantially constant thickness on the inclined surfaces 76. Therefore, the optical compensation member 70 is provided along the inclined surfaces 76. The inclination direction of the inclined surfaces 76 corresponds to the alignment direction P illustrated in FIG. 1. Further, the transmissive film 22 is formed to cover the optical compensation member 70, and the surface of the transmissive film 22, which is on a side opposite to the optical compensation member 70, is a flat surface.

The inorganic film 71 forming the optical compensation member 70 is formed of a multi-layer film obtained by alternatingly laminating a low-refractive index layer such as a silicon oxide film and a high-refractive index layer such as a tantalum oxide film, a niobium oxide film, a titanium oxide film, a silicon nitride film, and a silicon oxynitride film.

In the structure described above, an etching mask such as a gray scale mask is formed on a ground (substrate body 29), etching is performed, and thus the inclined surfaces 76 are formed. Further, at that time, etching or the like is utilized to shape the inclined surfaces 76 in some cases. Subsequently, the optical compensation member 70 is formed by the CVD method or the PVD method, and the transmissive film 22 is formed. Subsequently, the surface of the transmissive film 22 is flattened.

Note that, in the exemplary embodiment, the ground on which the inclined surfaces 76 are formed is the substrate body 29, but the ground may be a transmissive film such as a silicon oxide film. Further, in the exemplary embodiment, the optical compensation member 70 including the inclined surfaces 76 is formed on the first substrate 20. As illustrated in the sixth exemplary embodiment, the optical compensation member 70 including the inclined surfaces 76 may be formed on the second substrate 10.

Other Exemplary Embodiments

In the exemplary embodiments described above, the optical compensation member 70 is provided at one position of the third lens member 53 on a light incident side. For example, the optical compensation member 70 illustrated in FIG. 6, the optical compensation member 70 illustrated in FIG. 10, and the like may be provided at the one liquid crystal device 1. That is, the optical compensation members 70 may be provided at a plurality positions of the one liquid crystal device 1. In the exemplary embodiments described above, the case where the dust-proof first transmissive substrate 61 and the dust-proof second transmissive substrate 62 are provided is provided. However, the present disclosure may be applied to the liquid crystal device 1 to which one or both of the first transmissive substrate 61 and the second transmissive substrate 62 are not provided. In the exemplary embodiments described above, the present disclosure is applied to the liquid crystal device of a VA mode. The present disclosure may also be applied to a liquid crystal device of a TN mode, an IPS mode, and FFS mode, or an OCB mode. Further, in the exemplary embodiments described above, when the lens member is formed, the concave surface is formed in the ground, and the lens layer having a refractive index larger than that of the ground covers the concave surface. However, a convex surface is formed on the ground, and a lens layer having a refractive index smaller than that of the ground covers the convex surface. In this manner, the lens member may be formed.

Installation Example to Electronic Apparatus

Figure 13:
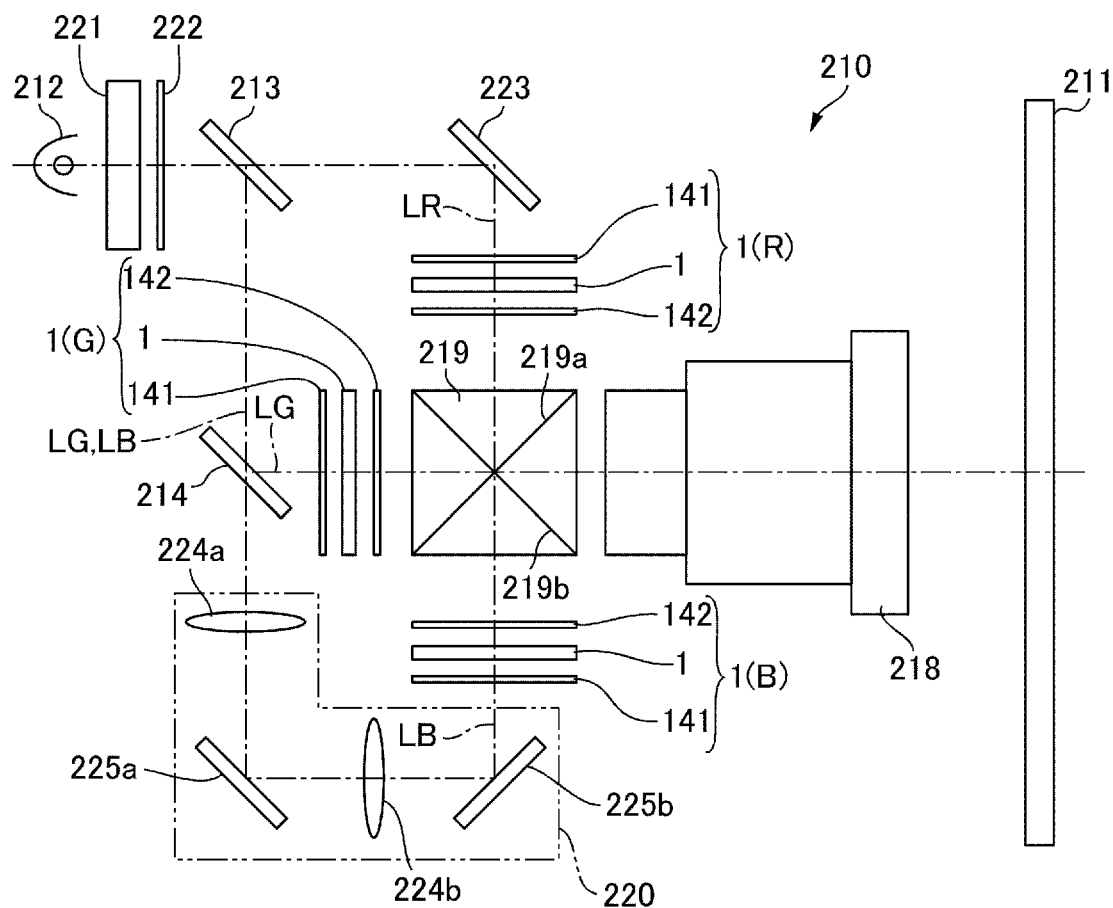
FIG. 13 is a schematic configuration view of a projection-type display apparatus (electronic apparatus) using a liquid crystal device to which the disclosure is applied.

FIG. 13 is a schematic configuration view of a projection-type display apparatus (electronic apparatus) using the liquid crystal device 1 to which the disclosure is applied. Note that, in the following description, a plurality of light valves (a red light valve 1(R), a green light valve 1(G), and a blue light valve 1(B)) to which light having wavelength regions different from one another is supplied are used. The liquid crystal device 1 to which the present disclosure is applied is used for each of the light valves. In this case, a first polarizing plate 141 and a second polarizing plate 142 are arranged in a cross-nicol alignment with respect to the liquid crystal device 1.

A projection-type display apparatus 210 illustrated in FIG. 13 is a forward projection type projector configured to project an image to a screen 211 provided in front of the projector. The projection-type display apparatus 210 includes a light source 212, dichroic mirrors 213 and 214, the three light valves (the red light valve 1(R), the green light valve 1(G), and the blue light valve 1(B)), a projection optical system 218, a cross dichroic prism 219 (color synthesis optical system), and a relay system 230.

The light source 212 includes an extra-high-pressure mercury lamp that supplies light source light containing red light, green light, and blue light, for example. The dichroic mirror 213 allows red light LR from the light source 212 to pass therethrough, and reflects green light LG and blue light LB. The dichroic mirror 214 allows the blue light LB from the green light LG and the blue light LB, which are reflected by the dichroic mirror 213, to pass therethrough, and reflects the green light LG. In this manner, the dichroic mirrors 213 and 214 constitute a color separation optical system that separates light emitted from the light source 212 into the red light LR, the green light LG, and the blue light LB. An integrator 221 and a polarization conversion element 222 are sequentially arranged, between the dichroic mirror 213 and the light source 212, from the light source 212. The integrator 221 equalizes the illuminance distribution of the light emitted from the light source 212. The polarization conversion element 222 converts the light from the light source 212 into linear polarization light having a specific vibration direction such as s-polarized light.

The red light valve 1(R) modulates the red light LR (illumination light), which passes though the dichroic mirror 213 and is reflected by the reflection mirror 223, in accordance with image signals, and emits the modulated red light LR (modulated light) toward the cross dichroic prism 219.

The green light valve 1(G) modulates the green light LG (illumination light), which is reflected by the dichroic mirror 213 and then is reflected by the dichroic mirror 214, in accordance with image signals, and emits the modulated green light LG (modulated light) toward the cross dichroic prism 219.

The blue light valve 1(B) modulates the blue light LB (illumination light), which is reflected by the dichroic mirror 213 and then passes through the relay system 230 after passing through the dichroic mirror 214, in accordance with image signals, and emits the modulated blue light LB (modulated light) toward the cross dichroic prism 219.

The relay system 230 includes relay micro lenses 224a and 224b and reflection mirrors 225a and 225b. The relay micro lenses 224a and 224b are provided to prevent the loss of light due to the long optical path of the blue light LB. The relay micro lens 224a is arranged between the dichroic mirror 214 and the reflection mirror 225a.

The relay micro lens 224b is arranged between the reflection mirrors 225a and 225b. The reflection mirror 225a is arranged to reflect, toward the relay micro lens 224b, the blue light LB passing through the dichroic mirror 214 and then is emitted from the relay micro lens 224a. The reflection mirror 225b is arranged to reflect, toward the optical modulator 1(B), the blue light LB emitted from the relay micro lens 224b.

The cross dichroic prism 219 serves as a color combining optical system in which two dichroic films 219a and 219b are orthogonally arranged in an X shape. The dichroic film 219a reflects the blue light LB and allows the green light LG to pass therethrough. The dichroic film 219b reflects the red light LR and allows the green light LG to pass therethrough.

Accordingly, the cross dichroic prism 219 is configured to synthesize the red light LR, the green light LG, and the blue light LB, which are modulated by the red light valve 1(R), the green light valve 1(G), and the blue light valve 1(B), respectively, and to emit the synthesized light toward the projection optical system 218. The projection optical system 218 includes a projection micro lens (not illustrated), and is configured to project the light synthesized by the cross dichroic prism 219 onto the screen 211.

Other Electronic Apparatuses

In a projection-type display apparatus, the liquid crystal device 1 may be configured to use, as a light source unit, an LED light source or a laser light source configured to emit light in various colors to supply light in various colors emitted from the light source to another liquid crystal device.

Further, the liquid crystal device 1 may be used in a forward projection-type projector that projects a projection image from an observation side, and may also be used in a rearward projection-type projector that projects a projection image from a side opposite to the observation side.

Further, the electronic apparatus to which the liquid crystal device 1 is applicable is not limited to the projection-type display apparatus 210. For example, the liquid crystal device 1 may be used as a projection-type head-up display (HUD), a direct viewing-type head-mounted display (HMD), and a display unit of an information terminal device such as an electronic book, a personal computer, a digital camera, a liquid crystal television, a view finder-type or a monitor direct viewing-type video recorder, a car navigation system, an electronic note book, and POS.

What is claimed is:

1. A liquid crystal device, comprising:
a first substrate being arranged on a light incident side, the first substrate having no light shielding member provided in a display region;
a liquid crystal layer; and
a second substrate that is on a light emission side of the first substrate and includes:
a substrate body;
a pixel electrode provided at a layer between the substrate body and the liquid crystal layer;
a light shielding member in a lattice shape, the light shielding member being provided at a layer between the substrate body and the pixel electrode;
a first lens member provided at a layer between the substrate body and the light shielding member;
a second lens member provided at a layer between the light shielding member and the pixel electrode; and a third lens member provided at a layer between the second lens member and the pixel electrode.

2. The liquid crystal device according to claim 1, comprising an optical compensation member on a light incident side of the third lens member.

3. The liquid crystal device according to claim 2, wherein the optical compensation member is provided on a light incident side of the first substrate.

4. The liquid crystal device according to claim 2, wherein the optical compensation member is provided at a layer between a counter electrode provided at the first substrate and a substrate body of the first substrate.

5. The liquid crystal device according to claim 2, wherein the optical compensation member is provided at a layer between the third lens member and the pixel electrode.

6. The liquid crystal device according to claim 2, wherein the optical compensation member includes at least any one of:

an optical compensation member having a negative uniaxial refractive index anisotropy;

an optical compensation member having a positive uniaxial refractive index anisotropy; and an optical compensation member having a uniaxial or biaxial refractive index ellipsoid inclined with respect to one surface of the substrate body of the first substrate.

7. The liquid crystal device according to claim 2, wherein the optical compensation member is provided along an inclined surface inclined with respect to the pixel electrode.

8. An electronic apparatus, comprising the liquid crystal device according to claim 1.

9. The electronic apparatus according to claim 8, comprising:

a light source unit configured to emit illumination light that enters the liquid crystal device; and a projection optical system configured to project modulated light emitted from the liquid crystal device.

* * * * *